A. McGREGOR.
VALVE.
APPLICATION FILED JAN. 28, 1920.

1,356,298.

Patented Oct. 19, 1920.

Inventor:
Alexander McGregor,
by Mitchell, Chadwick & Kent
Attys.

UNITED STATES PATENT OFFICE.

ALEXANDER McGREGOR, OF BOSTON, MASSACHUSETTS.

VALVE.

1,356,298.

Specification of Letters Patent.

Patented Oct. 19, 1920.

Application filed January 28, 1920. Serial No. 354,689.

*To all whom it may concern:*

Be it known that I, ALEXANDER McGREGOR, a citizen of the United States, residing at Boston, in the county of Suffolk and State of Massachusetts, have invented certain new and useful Improvements in Valves, of which the following is a specification.

This invention relates to improvements in valves. More particularly it relates to valves for the water side of governor-controlled steam-actuated pumps. Such mechanism is employed, for example, for keeping a tank filled with water to a predetermined pressure. Upon any fall of pressure in the tank a governor admits steam to the steam side and so operates the pump until the pressure is restored.

In the best pumps at present known to me in use, other than those embodying the present invention, it is common for the pump valves to give trouble owing to excessive wear from continuous use, with breakage of some parts ultimately resulting, followed by stoppage or loss. It is the object of the invention to provide a valve which combines in itself greater strength; less wear, and therefore less tendency to get into a condition where it is liable to jam, or break; and which is automatically graduated in its action according as heavy or light duty is required of it at any instant, so that in addition to reduction of wear there is under light duty an elimination of the noise that accompanies action at full capacity. These objects are accomplished by a combination of features, an important one of which is the relieving of the valve from duty a great part of the time by providing ports through it, closed by an auxiliary valve which does the work so long as the duty is light. During a greater part of the time, it may happen that the demands upon such a pump are relatively small although fairly continuous. It is uneconomical when the large valve has to open repeatedly for such small duty, but so far as I am aware no way has hitherto been known to avoid it. In the invention the small auxiliary valve with weak spring is the only valve that opens, so long as its capacity is sufficient to let water pass at the rate demanded by the steam governor. It is only when more capacity is required that the main valve opens. Wear of the main valve is reduced, and net strength increased, by making it a disk or cup having a substantial cylindrical length at its edge, and closely inclosing it with another cylindrical surface through which there are ports. This peripheral bearing is combined with an axial bearing of its stem. Thus a practically perfect alinement is maintained; for a little wear of the periphery would permit the edges of the disk to bind; and if there were no peripheral bearing the stem would quickly wear, as it does in valves now used in current practice, followed in time by jamming and breakage. But this peripheral bearing definitely retards the wear of the valve stem on any one side, and so on every side, of its bearing; and the absence of such wear or looseness of the stem in turn prevents the valve disk from swinging enough to jam its peripheral bearing, even after some degree of looseness has developed. The central and the peripheral bearings therefore support each other in maintaining a true alinement of the valve and its stem; and the superiority of this valve over others is increased by the fact that the stem and valve are integral with each other, with full metal strength not weakened by the reduction involved when the one is screwed into the other. The liability of breakage of any other interior part is reduced by a depending stationary central boss, axially penetrated by the stem, whose lower end constitutes a stop engaging the valve, on its repeated openings, to prevent it compressing either spring beyond its elastic limit. The auxiliary valve is a disk seated on the top of the main valve, or preferably within it, considering it as a shallow cup, and having an annular boss which surrounds and is guided on the stem of the main valve. This valve is a disk that works loosely on the stem, against a weak spring, covering a multiplicity of holes through the disks or bottom of cup, constituting the main valve. This, therefore, which works incessantly, can wear indefinitely without harm resulting, for it is so long and loose on the stem as not to bind; and if wear became great it would still be centered and guided to its seat by the inner walls of the cup.

Figure 1:
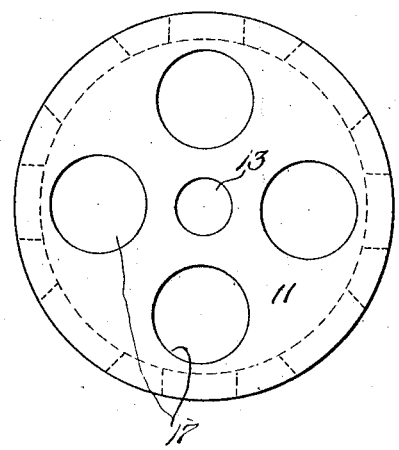
Figure 1 is a plan.
Figure 2:
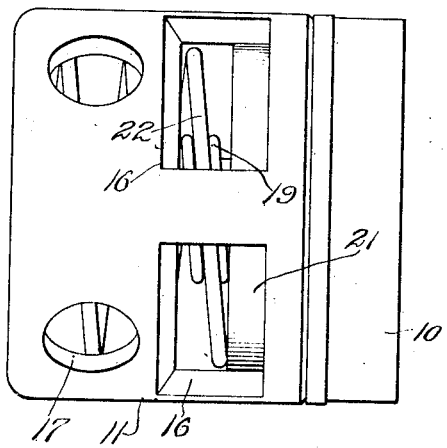
Fig. 2 is a side elevation of the complete valve.
Figure 3:
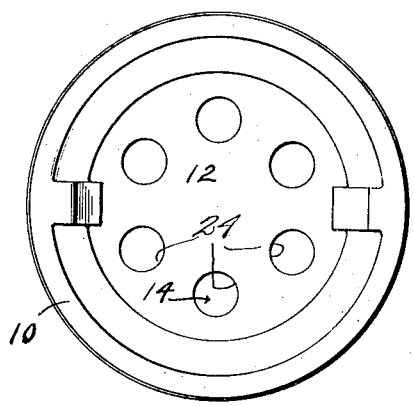
Fig. 3 is a bottom plan of the same.
Figure 4:
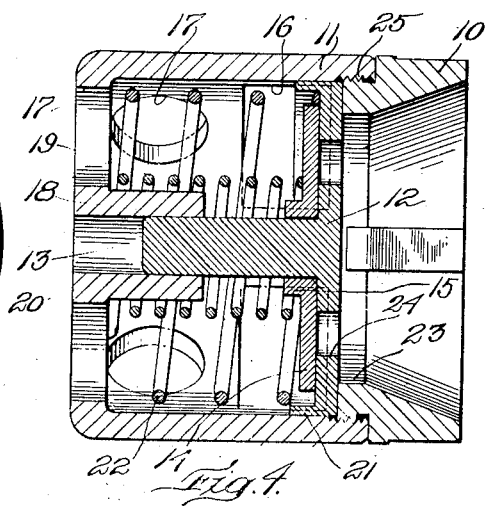
Fig. 4 is a side elevation of the same in medial section.

Referring to the drawings, 10 indicates the pipe or casing containing the water, 11 the casing or cage containing the valve which is about to be described, 12 the main valve thereof having a stem 13, and 14 the auxiliary valve thereof having a central boss 15 which serves as its guide. The casing 11 has side ports 16 for escape of water which passes through the valve, and may also have side and top openings 17 which serve to some degree for permitting free and full travel to the valve. There is a central boss 18 of this cage which, as illustrated, projects inward a considerable distance and serves three functions. The hole through its middle is the guide for the stem 13 of the main valve. Its exterior cylindrical surface is a rigid stem which supports and centers the spring 19 of the auxiliary valve, and its end 20 is a stop which limits the opening of both valves. The main valve 12 has bearings both by its stem 13 in the boss 18 as stated, and by its periphery 21 in the cylindrical interior of the cage 11. The periphery 21 is preferably a flange extending back cylindrically from the face of the valve, thus giving a substantial length of bearing of the edge of the main valve 12 on the cylindrical interior of the casing 11; and thus also making the valve cup-shaped. The interior of the cup holds the auxiliary valve 14 and the spring 22 of the main valve. The main valve closes the main passage 23 out through the casing 10, which is full size and unobstructed; and this main valve has a convenient number of holes 24 through it which together constitute the ordinarily used disk auxiliary valve 14 which is pressed against the bottom of the cup 21, 12, so as to close them by its spring 19. The spring 22 is relatively stiff and the spring 19 is relatively weak. In consequence, when there is a demand for only light duty, the valve 12 remains closed and the valve 14 opens, letting water through the main valve; but if the water thus flowing is not sufficient, the main valve opens. In the larger number of installations, and during by far the greater part of the time, the light inner valve is all that need work. In consequence, there is no wear at such times on the main valve. When the main valve moves, it is prevented from moving other than in a substantially axial direction, as it might otherwise, because the duplex guiding, at periphery and at axis, prevent it from twisting. Being in close contact with the cylindrical interior of the cage, it cannot press heavily on either side of its stem bearing in the boss 18; and having its stem in close contact with the said boss it cannot tilt out of perpendicularity to the axis so as to jam. The combination of bearing of the stem in its position near the top of the cage, and the cylindrical engagement of the valve on the inside of the cage near the bottom of the cage produces the effect of a cylindrical bearing so long as the total length of stem and valve, although in fact a considerable part of that total length is mere space left free to permit travel of the valve; and a bearing, so long as this is in the vertical sense, is practically secure against any possibility of jamming.

The cage 11 is readily separable from the casing 10 by a screw thread 25, thus making all parts of the valve accessible for any purpose, and particularly for renewal of the auxiliary valve. This is so light that its operation is silent; and such wear as occurs is at a portion of the stem of the main valve which has no part in the function of guiding the main valve, in case it wears any of that stem. The spring which operates it is close to the stem and thus prevents any binding thereon.

I claim as my invention:

1. A doubly guided and double valve, comprising the combination, with a valve seat, of a disk valve containing a port; peripheral guiding means therefor; central guiding means therefor; and a second valve arranged to open and close said port.

2. A doubly guided and double valve, comprising the combination with a seat, of a disk valve containing a port; peripheral guiding means therefor; central guiding means therefor; a second valve arranged to open and close said port; a spring engaging the first valve, around it and near its periphery, outside of and surrounding the second valve and pressing the first valve to its seat; and a second spring within the first spring and pressing the second valve toward said port.

3. A doubly guided and double valve, comprising the combination with a seat, of a disk valve containing a port; peripheral guiding means therefor; central guiding means therefor; a second valve arranged to open and close said port; and separate springs, for closing the two said valves, nested one within the other within the space between said peripheral guiding and central guiding means.

4. A doubly guided and double all-metallic valve, comprising the combination, with a metallic seat, of a metallic faced disk valve containing a port; a cage having peripheral guiding means and central guiding means therefor; a second metallic faced disk valve arranged to overlie said port; and springs within the cage pressing down from the top thereof upon the disk portions of the two said valves, the one spring being adjacent to the central guiding means and pressing both the valves, and the other adjacent to the peripheral guiding means and pressing only the first valve.

5. A valve comprising a seat, a cup valve closing it comprising a disk with peripheral cylindrical flange, a spring tending to seat it and a cage against which said spring presses close inside the periphery of said cup; ports through said valve disk, within the location of said spring and a second disk easily yieldable mounted within said location closing them.

6. A doubly guided valve having a rectilinear travel, comprising the combination, with a valve disk having a hard face and a seat having a hard face, of a cage having integrally connected peripheral and central guides for the valve; said cage having a screw threaded engagement with material which is integral with and on the same axis as the valve seat, whereby the said guides assemble with the said valve seat in perfect perpendicularity to the plane of the valve seat, making the valve guided thereby automatically tight seating.

Signed at Philadelphia, Pennsylvania, this twenty-seventh day of January, 1920.

ALEXANDER McGREGOR.